3,512,357
POWER FLUID
Douglas R. Paxton, Box AZ Main P.O.,
Ventura, Calif. 93001
No Drawing. Filed May 7, 1968, Ser. No. 727,341
Int. Cl. F01k 25/00, 3/18
U.S. Cl. 60—36      1 Claim

ABSTRACT OF THE DISCLOSURE

A method and compound for converting heat energy to mechanical energy in a closed cycle engine employing as a working medium one of the ethylene compounds with trichloroethylene having been found to be most advantageous.

BACKGROUND OF THE INVENTION

The method whereby heat energy, and particularly waste heat energy, is transformed into useful mechanical energy by vapor power cycles is well known. A well known type of cycle is the Rankine cycle (and variations thereof) to which the compound of this invention can be employed. However, it is envisioned that the working fluid of this invention will be employed in a cycle which is different from the common Rankine cycle.

The basic method of closed cycle engine operation comprises causing a suitable working medium to pass a heat exchange relationship with a source of heat energy of sufficient intensity to vaporize the working fluid; utilizing the energy of the expanding vapors to perform work by passing them through a turbine, machine or other work producing device; condensing the vapors; pumping the condensed liquid back into heat exchange relationship with the heat source to complete the cycle. Although there are numerous variations on this basic method, some of which will be discussed in more detail hereinafter, the method and compound of this invention is to be employed in combination with such a closed cycle type of engine.

A variety of working fluids have been tested in the past as power fluids, all of which suffer from any one or more of a number of serious drawbacks. For example, water and steam have been the most commercially utilized fluids. The disadvantages of water or steam as a power fluid include that of a high boiling point, high critical pressure, low density, all of which factors limit the power obtainable and result in the need for a relatively large and bulky engine apparatus. Furthermore, steam is deficient in entropy relationships wherein its saturation line, showing a decrease in entropy with an increasing temperature, and condenses upon isentropic expansion. Accordingly, the use of a steam cycle requires superheating and re-superheating to prevent condensation and formation of liquid in the turbine or other workproducing device, which in turn results in erosion and loss of efficiency.

Mercury is another example of a fluid which has been used as a power fluid, but the use of mercury in this capacity entails the disadvantages of high toxicity, high cost and also that of exhibiting unfavorable entropy changes along the saturation line.

A number of organic liquids have been tested for use of power fluids but there has been no single fluid which possesses all the important properties of being thermally stable in elevated temperatures, noncorrosive to ordinary materials of construction, and possession of a high cycle efficiency. Since as a rule the cycle efficiency increases with an increase in temperature, it is desirable that the power fluid exhibit a minimum of breakdown and a minimum of corrosive effects at its maximum efficient operating temperature. It is for this reason liquids with low thermal stability and high corrosion rates do not have much practical value as power fluids, notwithstanding other advantageous properties which they may possess, such as high inherent cycle efficiency.

Heretofore, organic compounds which have been commonly employed are trichloromonofluoromethane and trichlorotrifluorethane. Because of their relatively high thermal stability they appear to have the greatest potential for use as a power fluid. Unfortunately, each of these fluids is not of much practical value since the thermal stability of the former is relatively low and the inherent cycle efficiency of the latter is low. Another common organic compound which has been used is perfluorocyclobutane which has been found to be relatively stable. However, this compound has a low cycle efficiency, thus making it impractical as a power fluid.

Many other substances have been attempted to be used in the prior art. A typical list of such substances can be found in U.S. Pat. No. 3,234,734, to Buss et al., issued on Feb. 15, 1966. These substances have never added commercial significance because of their drawbacks to exhibit a significantly high cycle efficiency, low thermal stability, high corrosiveness, possession of unfavorable entropy changes along the saturation line, unfavorable critical properties, high toxicity, flammability, or any combination of the above. The need is thus indicated in the art for the provision of power fluid possessing a high cycle efficiency, good thermal stability and low corrosiveness, which does not possess to a significant extent various other disadvantageously properties encountered in the prior art.

SUMMARY OF THE INVENTION

This invention relates to a method of converting heat energy to mechanical energy and more particularly to the employment of power fluids selected from the ethylene group of compounds. Specifically, known types of ethylene type of fluids which have been found to be satisfactory are trichloroethylene, perchloroethylene, dichloroethylene, trichlorofluoroethylene, and dichloro-di-fluoroethylene. Particularly, ethylene type of power fluids have been found to be especially useful when employed in combination with a closed cycle engine which operates at a high pressure differential, such as between 1200 and 1500 p.s.i. The compound of the ethylene group which has been found to be most desirable is trichloroethylene. It is to be understood that description of this invention is primarily directed to trichloroethylene. However, the other members of the ethylene group may be employed which may have more desirable physical properties in other ways and less desirable in other ways.

Some of the advantages of trichlorethylene relative to steam are that it is one and one-half times as dense as water, which substantially increases the thermal capacity, has a lubricating value which tends to decrease internal friction within the engine, and is noncorrosive to the common engine materials of construction such as iron, steel and zinc. Other basic desirable properties of trichlorethylene is that it is relatively stable at a high temperature, its latent heat of vaporization is low, its critical pressure is below the operating pressure of the engine, it does not decompose at its critical temperature, and it superheats upon expansion in the vapor phase. Its atmospheric boiling point is slightly less than that of water with its freezing point being relatively 36° below that of water. This gives the working fluid greater operating range than that of water when employed in an engine. When trichlorethylene is vaporized its density is substantially greater than that of steam, therefore greater heat capacity characteristics are provided.

It is, accordingly, an object of this invention to provide a power fluid which possesses a good combination of physical, chemical and thermodynamic properties which are desirable in a working fluid for a closed power cycle.

It is another object of this invention to provide a power fluid possessing a high cycle efficiency of power fluids used heretofore.

Other objectives and advantages of the invention will become apparent from consideration of the following description taken in conjunction with the appended claims.

DESCRIPTION OF THE INVENTION

The type of environment in which the working medium of this invention is to be employed need not be specifically shown since such closed-cycle engines are common in the art. For examples of such closed-cycle engines, reference is made to Pat. Nos. 3,234,734 and 3,292,366. Basically, in such closed cycles the working fluid is pumped into a boiler or, in other words, is pumped into heat exchange relationship with a heat source. The heat energy from the heat source vaporizes the working fluid and the vapors therefrom are passed through a work device such as a machine or turbine in order to convert the energy of the expanding vapors into useful mechanical energy. The working fluid is expanded isentropically, i.e., at a constant entropy and a portion of their energy is converted into useful work. The function of converting heat energy to mechanical energy has been fulfilled at this point. However, in order to revise the working fluid, the cycle is completed by cooling the vapors which have passed through the workproducing device, liquifying them at substantially constant pressure, as in a condensor, and then pumping the condensed liquid back to the heat source for reuse.

The working fluid of this invention has been found to be of particular advantage when used in a closed-cycle engine in which the working fluid is under a substantially high pressure differential. Actually, it has been found that when the working fluid is under a pressure of 1200 p.s.i. or greater, maximum effect of the fluid is achieved. Such types of cycles can be any type of a cycle, such as variations of the normal Rankine cycle. However, the working fluid may be found to be of particular advantage in other types of cycles. The actual cycle in which the working fluid has proved to be of great advantage is in the regenerative type of cycle. Basically, in a regenerative cycle, the turbine exhaust which may include superheat from the power cycle is employed to raise the temperature of the working fluid after it leaves the condensor. Therefore, when the working fluid passes in heat exchange relationship with the ultimate heat source, a greater proportion of the heat energy of the heat source is utilized to vaporize the fluid and provide expanding vapor force for driving the turbine or other work producing device, as compared with that proportion of the heat energy of the heat source, which is utilized in the power fluid to the point at which additional heat will cause the desired vaporization. Thus, in a regenerative type of system, the relative overall efficiency standard system may be increased.

The particular type of power fluid of this invention is broadly defined as an ethylene compound, particularly compounds of the group consisting of trichlorethylene, perchlorethylene, dichlorethylene, trichlorfluorethylene and trichloro-2-fluorethylene have been found to be most advantageous. Of the aforementioned group trichlorethylene has been found to be of best advantage because of its physical characteristics and properties. Trichlorethylene, the principal power fluid of this invention, is a well known compound. It can be prepared economically by well known methods and is commercially available. Some of the physical and chemical properties of trichlorethylene are listed in the following table:

TABLE I

Properties of trichloroethylene (a) Critical temperature—519.8° F.
(b) Critical pressure—717.75 p.s.i.a.
(c) Molecular weight—313.4
(d) Liquid density at 81° F.—89.26 lb./ft.$^3$
(e) Boiling point—86.9° C.
(f) Freezing point—86.4° C.
(g) Specific heat—.225 cal./gm. at 0° C.
(h) Heat of vaporization—104.5 B.t.u./lb.
(i) Flammability—non-flammable From the above discussion and description of the invention, it will be obvious that the advantageous properties of the power fluid of the invention may be used in conjunction with a variety of well known power recovery systems, thermodynamic cycles and for a variety of well known applications. It will be equally obvious that other variations, cycles and applications may also be readily devised and employed by those skilled in the art, which also may be used to take advantage of those properties of trichlorethylene, which make it especially suitable for use as a power fluid. For these reasons, the invention is not to be limited by any specific or illustrative embodiment, modification or application discussed herein but only by the scope of the appended claim.

I claim:

1. A method of converting heat energy into mechanical energy in a closed power cycle, comprising the steps of:
 (a) heating a working fluid selected from the group consisting of trichloroethylene, perchloroethylene, dichloroethylene, trichlorofluoroethylene and dichloro-di-fluoroethylene until the working fluid is converted from a liquid state to a vapor state;
 (b) transferring the vaporized working fluid to a work-producing device for converting energy contained in the working fluid into mechanical energy;
 (c) removing thermal energy from the exhaust of the work-producing device to be utilized in regeneratively heating the working fluid;
 (d) condensing the working fluid from its vapor state to a liquid state;
 (e) pressurizing the liquid working fluid to above approximately 1200 p.s.i.;
 (f) applying the thermal energy removed from the exhaust of the work-producing device to the pressurized liquid working fluid, and,
 (g) recycling the working fluid.

References Cited

UNITED STATES PATENTS

| | | | |
|---|---|---|---|
| 2,597,890 | 5/1952 | Monk | 60—36 XR |
| 3,234,734 | 2/1966 | Buss et al. | 60—36 |

FOREIGN PATENTS

| | | |
|---|---|---|
| 8,177 | 11/1910 | Great Britain. |
| 21,127 | 9/1912 | Great Britain. |
| 15,312 | 6/1914 | Great Britain. |
| 526,733 | 7/1921 | France. |
| 383,606 | 10/1923 | Germany. |

MARTIN P. SCHWADRON, Primary Examiner

R. R. BUNEVICH, Assistant Examiner

U.S. Cl. X.R.

60—59